(12) United States Patent
Kurita et al.

(10) Patent No.: US 9,227,577 B2
(45) Date of Patent: Jan. 5, 2016

(54) ACOUSTIC INSULATION DEVICE FOR MOBILE VEHICLE

(75) Inventors: Takeshi Kurita, Tokyo (JP); Fumio Mizushima, Tokyo (JP)

(73) Assignee: East Japan Railway Company, Tokyo (JP)

( * ) Notice: Subject to any disclaimer, the term of this patent is extended or adjusted under 35 U.S.C. 154(b) by 0 days.

(21) Appl. No.: 14/123,132

(22) PCT Filed: May 25, 2012

(86) PCT No.: PCT/JP2012/063483
§ 371 (c)(1),
(2), (4) Date: Feb. 14, 2014

(87) PCT Pub. No.: WO2012/165331
PCT Pub. Date: Dec. 6, 2012

(65) Prior Publication Data
US 2014/0203596 A1    Jul. 24, 2014

(30) Foreign Application Priority Data
May 31, 2011 (JP) ................................. 2011-121706

(51) Int. Cl.
*B60R 13/08* (2006.01)
*B60L 5/18* (2006.01)
*B61D 49/00* (2006.01)
*G10K 11/16* (2006.01)

(52) U.S. Cl.
CPC . *B60R 13/08* (2013.01); *B60L 5/18* (2013.01); *B61D 49/00* (2013.01); *G10K 11/161* (2013.01); *B60L 2200/26* (2013.01)

(58) Field of Classification Search
CPC ............ B60R 13/08; B61D 49/00; B60L 5/18

USPC ................................... 181/210, 211; 296/211
See application file for complete search history.

(56) References Cited

FOREIGN PATENT DOCUMENTS

| JP | 4-80203 | 7/1992 |
|---|---|---|
| JP | 8-85921 | 4/1996 |
| JP | 08-098306 | 4/1996 |

(Continued)

OTHER PUBLICATIONS

International Preliminary Report on Patentability, International Application No. PCT/JP2012/063483, May 25, 2012.

*Primary Examiner* — Jeremy Luks
(74) *Attorney, Agent, or Firm* — Jones Robb, PLLC

(57) ABSTRACT

Provided is an acoustic insulation device for a mobile vehicle in which sound transmitted to the exterior of the vehicle body is blocked by being reflected or diffracted by acoustic insulation bodies provided upright to the vehicle body; and the amount of noise that an observer or local residents are subjected to is further reduced. Movement of a mobile vehicle generates noise in, and in the vicinity of, a power collector or a similar device provided upright on the roof (3) of the vehicle. Acoustic insulation bodies (1L), (2L), (1R), (2R) are provided upright on the roof (3), and block noise travelling directly ahead. The noise is diffracted or reflected by the acoustic insulation bodies (1L), (2L), (1R), (2R), and moves so as to be transmitted to the vehicle exterior. However, a branched, blade-shaped acoustic insulation body (1LB) provided to the acoustic insulation body (2L), or branched acoustic insulation bodies (1RB1), (1RB2) provided to the acoustic insulation body (2R), act on the diffracted or reflected noise to block sound, and therefore makes it possible to provide an acoustic insulation device for a mobile vehicle in which transmission to the outside of the vehicle body is minimized and the resulting noise is reduced.

19 Claims, 12 Drawing Sheets

(56) References Cited

FOREIGN PATENT DOCUMENTS

| JP | 2001-034272 | 2/2001 |
| JP | 2006103419 A * | 4/2006 |
| JP | 2006-159938 | 6/2006 |
| JP | 2009-179191 | 8/2009 |

* cited by examiner

ACOUSTIC INSULATION DEVICE FOR MOBILE VEHICLE

The present application is the U.S. National Phase of International Application No. PCT/JP2012/063483, filed on May 25, 2012, which claims the benefit of Japanese Patent Application No. 2011-121706, filed on May 31, 2011, the entire contents of which are hereby incorporated by reference.

TECHNICAL FIELD

The present invention relates to an acoustic insulation device for a mobile vehicle such as a railway vehicle, and specifically, relates to an acoustic insulation device for a mobile vehicle that blocks the noise generated from a power collector disposed on a roof of a high-speed railway vehicle.

BACKGROUND ART

Conventionally, in railway vehicles, and especially in railway vehicles that travel at high speed, there are concerns that the noise generated in, and in the vicinity of, a device, especially a power collector, disposed on the roof of the vehicle may be increased by the increase in speed of the railway vehicles, so in order to insulate such noise, acoustic insulation bodies which are placed with a distance from the rooftop device in a width direction of the vehicle body and having a given length along the longitudinal direction of the vehicle body are provided on the roof.

On the other hand, in Shinkansen (bullet train) lines that are designed to be able to travel through conventional railway sections, such as miniature Shinkansens which travel from Shinkansen tracks directly to conventional railway lines, wherein the conventional railway lines have the track gauge converted from a narrow track for conventional railways to a standard gauge, the critical range of the vehicle body is narrow, so that the restrictions related to the width of the vehicle body or the height of the vehicle body are strict compared to Shinkansen sections, and in order to cope with such restrictions, there are demands for downsizing the device for insulating (blocking) the noise generated from the devices disposed on the roof of the vehicle.

In order to reduce or insulate the noise generated from devices such as the power collector disposed on the roof of the vehicle body of a mobile vehicle, an art of covering the vicinity of the power collector with a wind cover and providing an acoustic insulation wall for insulating noise to the outer side of the wind cover is already proposed, and an acoustic insulation device as disclosed in patent literature 1 is already proposed. In other words, an acoustic insulation device for a mobile vehicle having a simple configuration and having a high sound insulating effect is proposed, that fits within the critical range of vehicles in a conventional railway section, and that enables to ensure sufficient insulation distance between the acoustic insulation panel and the power collector. The acoustic insulation means is composed of first and second acoustic insulation bodies provided upright in a chevron-shape in a width direction of the vehicle body with respect to a device on the roof and having a predetermined length along a longitudinal direction of the vehicle body, wherein the first acoustic insulation body is arranged rearward to the second acoustic insulation body with respect to a direction of travel of the mobile vehicle.

Further, there is proposed a soundproof wall that is used as a side wall for roads, railways, factories and so on, that exerts sufficient soundproof effect not only for the nose that travels upward from a low area, but for the noise that travels downward from the upper area (patent literature 2). The soundproof wall illustrated in patent literature 2 has a first bifurcation wall that is inclined to a noise source side at an upper end of a main wall that extends upward, and a second bifurcation wall that is inclined to an opposite side from the noise source side, wherein at least one bifurcation wall out of the first and second bifurcation walls has a re-bifurcation wall that is re-bifurcated to a direction that differs from said bifurcation wall.

However, the soundproof wall taught in patent literature 2 is a soundproof wall that is provided at a fixed location such as on the ground, and there is no consideration on placing the wall on a railway vehicle that travels at a high speed. Therefore, it is difficult to apply the soundproof wall simply to a railway vehicle to realize a design that fits within the critical range of the vehicle. In addition, if there is a need to provide a means for insulating noise generated from a power collector of the railway vehicle, an insulation distance (the range of distance in which an object cannot be placed for insulation) with respect to the high voltage section of the power collector must be ensured, so that it is difficult to satisfy this request according to the method taught in patent literature 2.

In a railway vehicle, the main noise source is the power collector disposed on the roof of the vehicle. The acoustic insulation device of a mobile vehicle according to patent document 1 has been developed to block the noise generated from the power collector efficiently. The acoustic insulation device for a mobile vehicle is disposed to block the main source of noise that appears on a downstream side of the direction of flow of the noise source from an observer of the noise (or local residents) considering the direct advancing property of sound. However, sound not only has a direct advancing property, but it also has a reflecting or diffracting property. As for the noise generated from a power collector of the mobile vehicle, a portion of the noise is reflected or diffracted to come around the sound insulation wall and reaches the observer of the noise (or local residents).

CITATION LIST

Patent Literature

[PTL 1] Japanese Patent Application Laid-Open Publication No. 2009-179191
[PTL 2] Japanese Patent Application Laid-Open Publication No. 08-085921

SUMMARY OF INVENTION

Technical Problem

Therefore, the technical problem to be solved is to provide a means for blocking the noise being reflected or diffracted on acoustic insulation bodies provided upright to the vehicle body of a mobile vehicle and being transmitted outside the vehicle body, so as to further reduce the noise reaching the observer of the noise (or local residents).

The object of the present invention is to provide an acoustic insulation device for a mobile vehicle for blocking the noise that is reflected or diffracted on the acoustic insulation bodies provided upright to the vehicle body and being transmitted outside the vehicle body, that can fit within the critical range of the vehicle traveling in a conventional railway section, and that can ensure a sufficient insulation distance with the power collector, so that the noise reaching the observer (or local residents) is further reduced.

Solution to Problem

In order to solve the problems mentioned above, the present invention provides an acoustic insulation device for a mobile vehicle having acoustic insulation bodies provided upright on a roof of the vehicle body so as to oppose to a device disposed on the roof on both sides in a width direction of the vehicle body; wherein the acoustic insulation device acts on a noise generated in, and in the vicinity of, the device and diffracted or reflected on the acoustic insulation body to suppress transmission of the noise to an outer side of the vehicle body.

According to the present invention, when a mobile vehicle travels, the noise generated in a device disposed on the rooftop and in the vicinity thereof when the vehicle travels is diffracted or reflected by the acoustic insulation bodies provided upright to the roof, and then the noise is transmitted to the outside of the vehicle, but since the acoustic insulation bodies act on the diffracted or reflected noise and prevent the noise from being transmitted to the outer side of the vehicle body, noise can be reduced efficiently.

One example of the means for acting on the noise being diffracted or reflected on the acoustic insulation bodies is an acoustic insulation body that is branched from the main acoustic insulation body provided upright on both width-direction sides of the vehicle body with respect to the device on the roof when seen via a projection from the longitudinal direction of the vehicle body. Further, it is possible to provide a secondary acoustic insulation body with respect to the main acoustic insulation body, so that the projection planes of the main acoustic insulation body and the secondary acoustic insulation body partially overlap. Furthermore, it is possible to provide a secondary acoustic insulation body at a position offset in the width direction of the vehicle body with respect to the main acoustic insulation body, so that when a projection is taken in the width direction of the vehicle body, the projection planes partially overlap. In any case, it is requested that that the requested critical range of the vehicle body and the insulation distance from the high voltage section of the power collector are ensured.

Advantageous Effects of Invention

According to the acoustic insulation device for a mobile vehicle of the present invention, the acoustic insulation body branched from the acoustic insulation body provided upright to the roof not only insulates direct noise but also reduces the noise being reflected or diffracted by conventional acoustic insulation bodies and reaching the observer (or local residents). However, since the branched acoustic insulation body itself may cause noise when the vehicle travels, noise is effectively reduced as a whole by disposing the branched acoustic insulation body so that only a portion of the area overlaps with the main acoustic insulation body instead of having all the area thereof overlap. Based on this effect, the present acoustic insulation device can realize the effect of reducing noise that is generated when the vehicle is traveling.

In the case of railway vehicles, the source of noise moves together when the vehicle travels. Therefore, the relative positional relationship between the observer of the noise (or local residents) and the noise source differs constantly. According to the configuration of the acoustic insulation bodies of the present invention, the areas of the acoustic insulation bodies partially overlap with each other, so that the sound blocking property can be achieved even when the sound source is moving.

DESCRIPTION OF EMBODIMENTS

Figure 1:
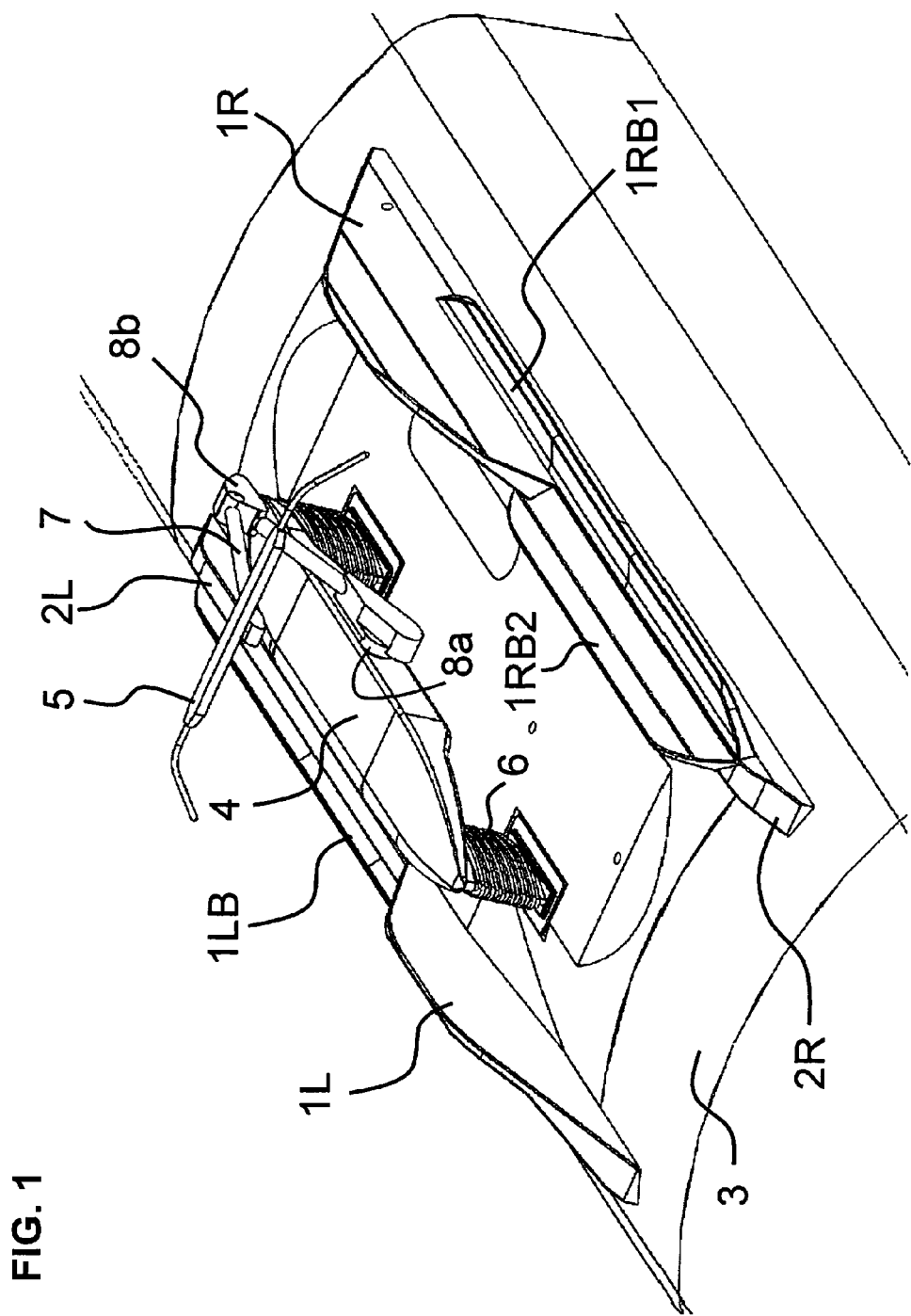
FIG. 1 is a perspective view of a power collector unit illustrating a first preferred embodiment of an acoustic insulation device for a mobile vehicle.

Now, the preferred embodiments of an acoustic insulation device for a mobile vehicle according to the present invention will be described with reference to the drawings.

Embodiment 1

FIGS. 1 through 4 illustrate a first preferred embodiment of an acoustic insulation device for a mobile vehicle according to the present invention, showing the device in perspective view, front view, left side view and right side view, respectively. A mobile vehicle such as a railway vehicle running on tracks has multiple cars connected to realize a train formation, and a power collector, which is one of multiple roof-disposed devices, is disposed on a roof 3 of a specific car out of the multiple cars. As shown in FIGS. 1 through 4, a power collector is disposed on the roof 3 of a mobile vehicle. The power collector is mainly composed of an insulator 6 fixed to the roof 3 of the vehicle, an underframe 4 supported on the insulator 6, a collector shoe 5 coming in contact with the overhead wire to collect power from the overhead wire, an arm 7 supporting the shaft of the collector shoe 5 on the upper end, and hinges 8a and 8b. The shaft of the arm 7 is supported by the hinge 8a having a rotation axis that is parallel with a width direction of the vehicle body with respect to the underframe 4, and the arm can be folded down to store the collector shoe 5 in an inactive position or can be raised up to take a power collecting position, via a joint function realized by a hinge 8b disposed at an intermediate joint section between the hinge 8a and the arm 7.

The insulator 6 is located at a position offset by a predetermined distance toward one side in the width direction of the vehicle body from a center of the width direction, and in correspondence thereto, the center position of the collector shoe 5 in the left and right directions of the body and the location of the arm 7 and hinges 8a and 8b are substantially at the center of the width direction of the vehicle body. The collector shoe 5 of the power collector is electrically connected to a different power collector within the same train formation. Therefore, even when the collector shoe 5 is stored in the inactive position, if the different power collector is collecting power, the collector shoe 5 will be charged to a same potential as the collector shoe of the different power collector.

Acoustic insulation bodies are disposed at opposing locations having the power collector intervened therebetween in the width direction of the vehicle body on the roof 3 of the vehicle body. On the left side of the power collector in the direction of travel of the vehicle, the acoustic insulation bodies are composed of a main acoustic insulation body 1L and an acoustic insulation body 2L having a smaller height. The acoustic insulation bodies 1L and 2L are disposed at the same width-direction position of the vehicle body, and divided continuous wall bodies are disposed in the longitudinal direction of the vehicle body. On the other hand, on the right side of the power collector in the direction of travel of the vehicle, the acoustic insulation bodies are composed of a main acoustic insulation body 1R having a higher height and an acoustic insulation body 2R having a lower height. The acoustic insulation bodies 1R and 2R are disposed at the same width-direction position of the vehicle body, wherein divided continuous wall bodies are disposed in the longitudinal direction of the vehicle body.

The acoustic insulation body 1L is disposed at a position opposing to one insulator 6 in the direction of travel of the vehicle, and the acoustic insulation body 1R is disposed at a position opposing to another insulator 6. These acoustic insulation bodies 1L and 1R are wall bodies formed in a chevron-like shape along the direction of travel of the vehicle, and the heights of the top of the insulation bodies are substantially equivalent to the height of the insulator 6. The arrangements of the acoustic insulation bodies 1L and 2L in the longitudinal direction of the vehicle body are opposite to 1R and 2R, so that when seen from the side direction, the acoustic insulation bodies 1L and 1R are not overlapped in the direction of travel of the vehicle, in other words, the bodies 1L and 1R are disposed so as not to substantially overlap with one another in the direction of travel of the vehicle. When seen from the side, the acoustic insulation body 1L opposes to the acoustic insulation body 2R, and the acoustic insulation body 1R opposes to the acoustic insulation body 2L.

When the vehicle having the acoustic insulation device arranged as above travels, noise is generated by traveling wind from the shoe body 5, the insulator 6 and the arm 7 of the power collector being one of the rooftop devices, but the arrangement of the present acoustic insulation bodies enables to insulate such noise. That is, the movement of the vehicle causes the noise source of the power collector to move relatively rearward with respect to the direction of travel of the vehicle, and the alternating arrangement of the acoustic insulation bodies 1L and 1R causes the left-side acoustic insulation body 1L to be displaced rearward in the direction of travel of the vehicle with respect to the acoustic insulation body 1R disposed on the right side, so that the noise generated from the collector shoe 5, the power collector insulator 6 and the power collector arm 7 can be blocked efficiently from the observer (or the resident area) on the left side of the direction of travel of the vehicle. Further, by disposing the chevron-shaped acoustic insulation bodies 1L and 1R having substantially the same height as the insulator 6 in an alternating manner, the skirts of the chevron-shapes of the acoustic insulation bodies 1L and 1R oppose one another with respect to the collector shoe 5, which takes a non-power collecting position with the arm 7 folded, can ensure sufficient insulating distance without having to form notches. Further, by disposing the acoustic insulation bodies 1L and 1R having substantially the same height in an alternating manner, the flow speed will not be increased between the acoustic insulation bodies 1L and 1R, so that the increase of aerodynamic noise from the power collector can be prevented, and at the same time, the acoustic insulation bodies 1L and 1R can be stored within the critical range of conventional railway vehicles, and further, since the area exposed to the traveling wind becomes relatively small, the aerodynamic noise generated from the acoustic insulation bodies 1L and 1R can be minimized. According to the present embodiment, the acoustic insulation effect of a vehicle can be improved by disposing acoustic insulation bodies 1L and 1R having simple configurations, the insulating distance can be ensured by using acoustic insulation bodies having a maximum height that falls within the critical range of conventional railway vehicle sections, and the acoustic insulation effect can be achieved.

Figure 2:
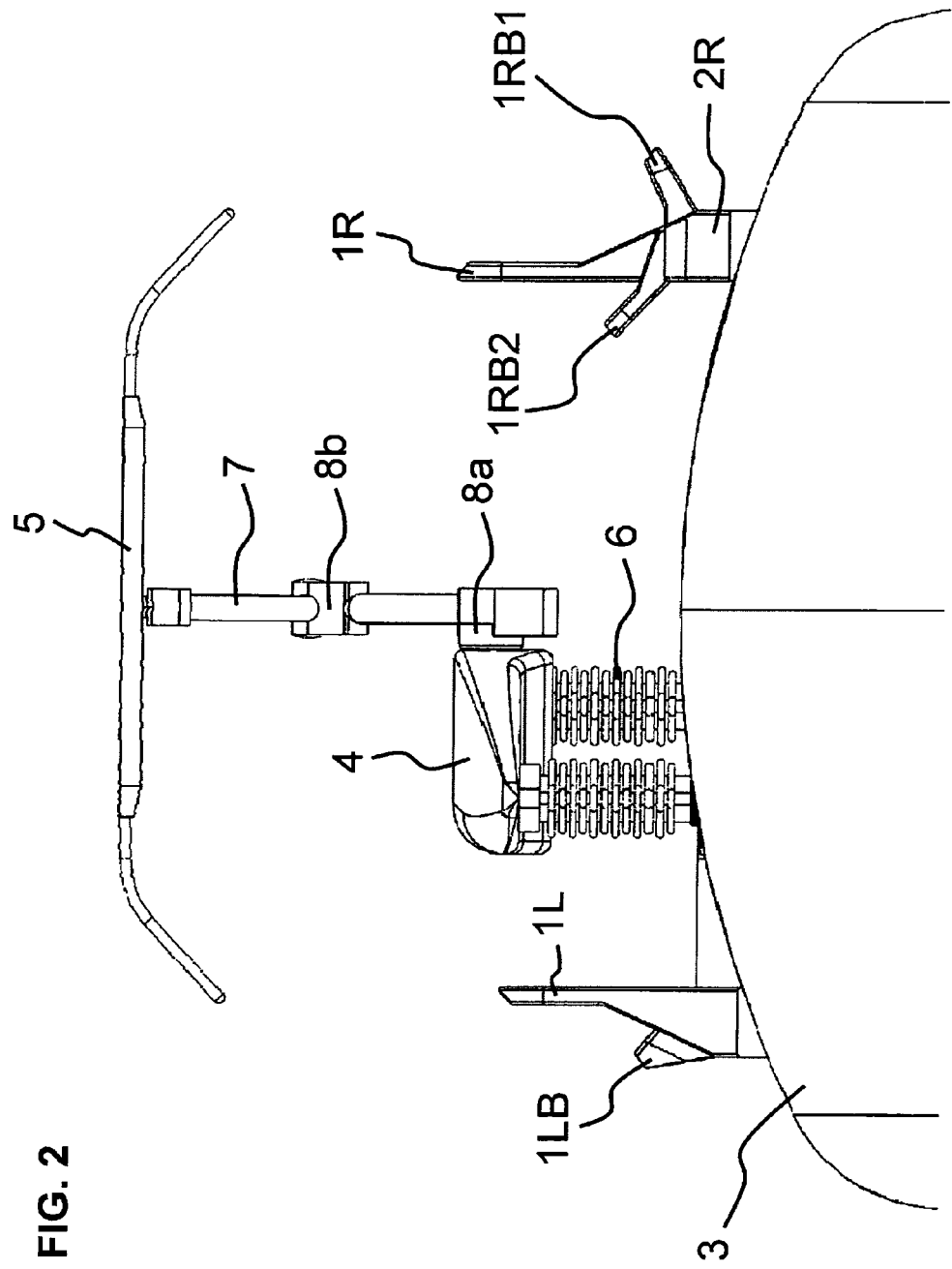
FIG. 2 is a front view of the power collector unit shown in FIG. 1.

As shown specifically in FIGS. 1 and 2, an acoustic insulation body 2L having a smaller height disposed on one side (left side) in the width direction of the vehicle body on the roof 3 includes an acoustic insulation body 1LB branched to an outer side in the width direction of the vehicle. According to the arrangement of the acoustic insulation bodies, as shown in FIG. 2, acoustic insulation bodies 1L and 2L (not shown in the drawing because of its positional relationship) are provided upright, and an acoustic insulation body 1LB is arranged to be branched to the outer side in the width direction of the vehicle body from the acoustic insulation body 2L. On the other side (right side) in the width direction of the vehicle body, the acoustic insulation body 2R having a smaller height disposed on the roof 3 includes an acoustic insulation body 1RB1 branched to an outer side in the width direction of the vehicle body and an acoustic insulation body 1RB2 branched to an inner side in the width direction of the vehicle body. According to the positional relationship of acoustic insulation bodies, as shown in FIG. 2, acoustic insulation bodies 1R and 2R are provided upright, and acoustic insulation bodies 1RB1 and 1RB2 are branched from the acoustic insulation body 2R.

Figure 3:
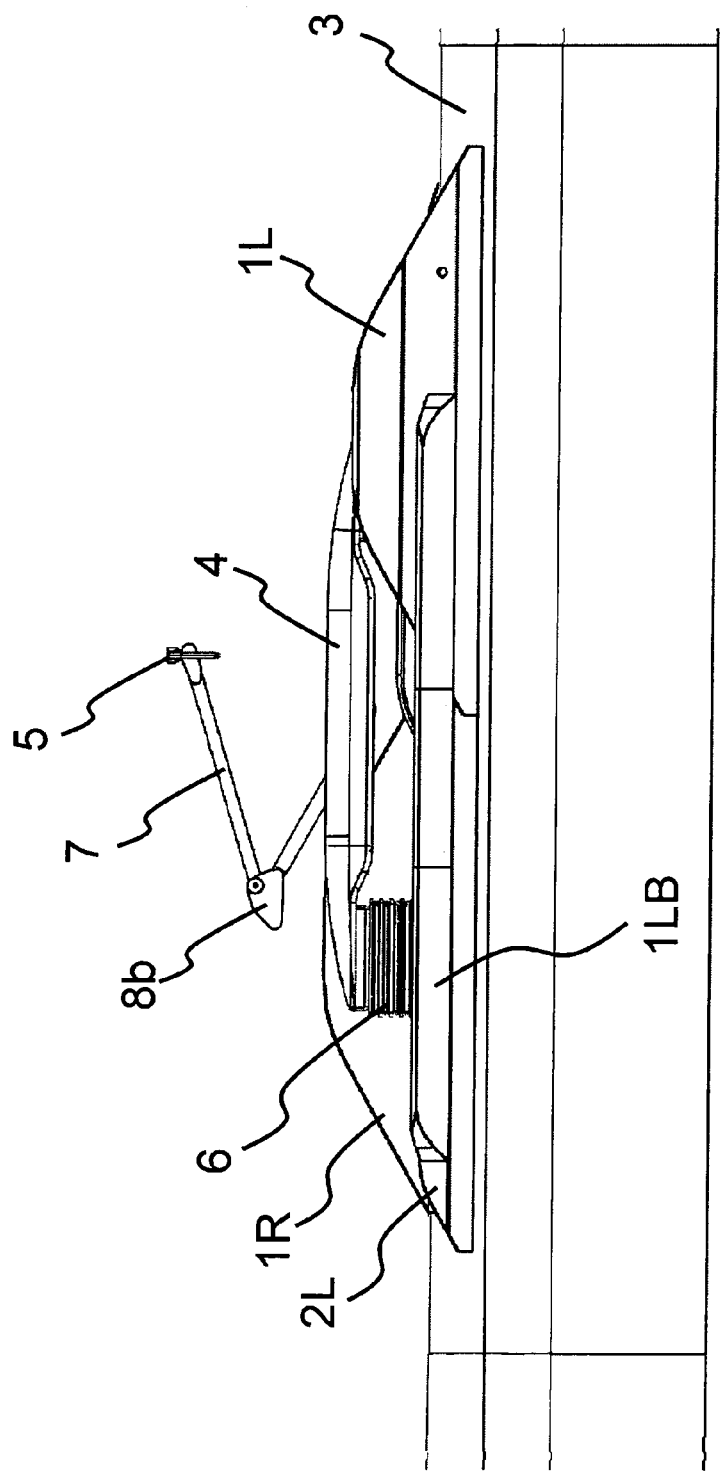
FIG. 3 is a left side view of the power collector unit shown in FIG. 1.

FIG. 3 illustrates the present configuration from the left side. The acoustic insulation body disposed on the left side of the power collector is composed of a high acoustic insulation body 1L, a low acoustic insulation body 2L, and an acoustic insulation body 1LB branched from the acoustic insulation body 2L. The branched acoustic insulation body 1LB has a portion thereof overlap with the acoustic insulation bodies 1L and 2L provided upright, when seen from the side.

Figure 4:
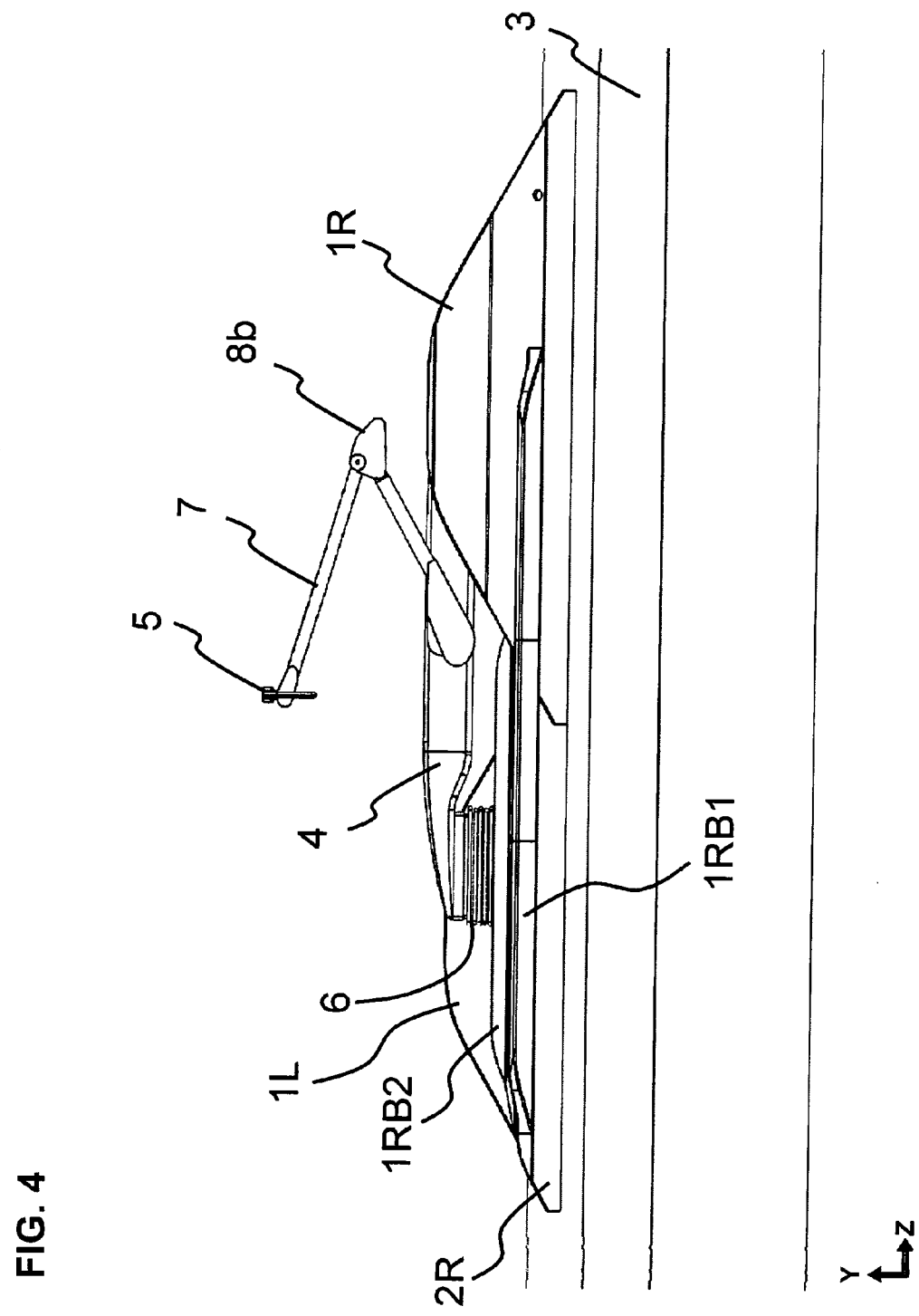
FIG. 4 is a right side view of the power collector unit shown in FIG. 1.
Figure 5:
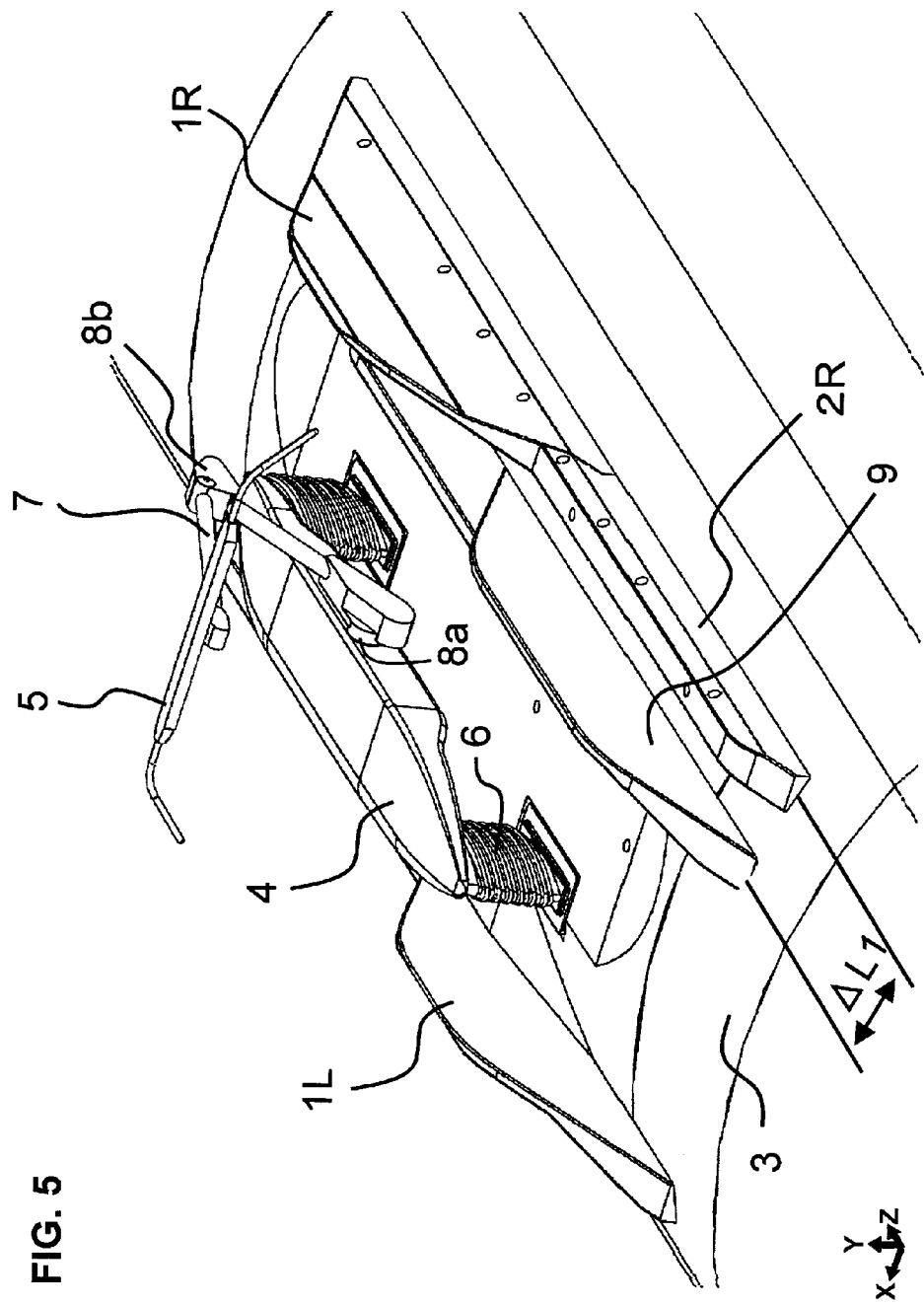
FIG. 5 is a perspective view of a power collector unit illustrating a second preferred embodiment of the acoustic insulation device for a mobile vehicle.

FIG. 4 illustrates the present configuration from the right side. The acoustic insulation body disposed on the right side of the power collector is composed of a high acoustic insulation body 1R, a low acoustic insulation body 2R, an acoustic insulation body 1RB1 branched toward an outer side of the acoustic insulation body 2R, and an acoustic insulation body 1RB2 branched toward the inner side thereof. The branched acoustic insulation bodies 1RB1 and 1RB2 are disposed so that a portion of the areas overlap with the acoustic insulation bodies 1R and 2R provided upright, when seen from the side.

The branched acoustic insulation bodies 1LB, 1RB1 and 1RB2 are extended obliquely upward from the upper side of acoustic insulation bodies 2L and 2R, respectively. Further, as shown in FIGS. 1 and 3, the acoustic insulation body 1LB branched from the acoustic insulation body 2L is extended along the longitudinal direction of the vehicle body to reach substantially the center of the longitudinal direction of the acoustic insulation body 1L. Further, as shown in FIGS. 1 and 4, the acoustic insulation body 1RB1 branched from the acoustic insulation body 2R is extended along the longitudinal direction of the vehicle body to reach substantially the center of the longitudinal direction of the acoustic insulation body 1R. The aerodynamic noise generated from the power collector and the vicinity thereof can be directly blocked by the acoustic insulation body composed of main acoustic insulation bodies and the acoustic insulation bodies branched therefrom, and even the reflected sound or the diffracted sound can be prevented effectively from being transmitted to the outer side of the vehicle body from the roof 3, so that the acoustic insulation function can be further enhanced.

The branched acoustic insulation bodies 1LB, 1RB1 and 1RB2 are located at positions so as not to interfere with the critical range of the vehicle in the conventional railway sections and the insulation distance of power collectors. Since the power collector is biased toward the left side with respect to the center of the vehicle, as shown in FIG. 2, a branched acoustic insulation body cannot be disposed on the inner side of the acoustic insulation body 2R disposed on the left side of the vehicle because of the insulation distance of the power collector, but if there is enough room from the viewpoint of critical range of the vehicle and the insulation distance of the power collector, a branched body can be disposed on the inner side or on both sides in the width direction of the vehicle body. Further, even just one of the branched acoustic insulation bodies 1RB1 and 1RB2 on the right side insulation body can exert an acoustic insulation effect. Based on actual measurement results, it is recognized that the branched acoustic insulation bodies disposed on the outer side in the width direction of the vehicle body exerts greater sound insulating effects. Further, the illustrated example shows the branched acoustic insulation bodies to be disposed on lower acoustic insulation bodies and extending to the middle of the higher acoustic insulation bodies, but it is possible to have the bodies extend to cover the whole length of the higher acoustic insulation bodies.

The present embodiment having the above-described arrangement enables to provide a simple configuration with a high sound insulating effect, that fits within the critical range of the vehicle in conventional railway sections, and that can ensure sufficient insulation distance between acoustic insulation bodies and the power collector. Furthermore, by only providing acoustic insulation bodies (or acoustic insulation walls), the sound insulating effect of noises generated from the power collector or other devices disposed on the roof can be achieved without increasing the cross-sectional area of the vehicle body. Moreover, considering the critical range of vehicles in conventional railway sections, the height of the acoustic insulation bodies are set lower compared to conventional acoustic insulation bodies. In order to prevent grounding between the acoustic insulation bodies and the horns of the power collector or the insulator, the insulation distance is also ensured between the acoustic insulation bodies and the power collector. Even further, by the branched acoustic insulation bodies, not only the direct noise but also the reflected sound from the opposing acoustic insulation bodies or the diffracted sound that comes around the acoustic insulation bodies can be suppressed from being transmitted to the outer side of the vehicle.

Embodiment 2

The second embodiment of the present invention will be described with reference to FIGS. 5 through 8. FIGS. 5 through 8 illustrate a second embodiment of an acoustic insulation device for a mobile vehicle, showing the device in perspective view, front view, left side view and right side view, respectively. The members exerting equivalent functions as those of embodiment 1 are denoted by the same reference numbers in embodiment 2, and detailed descriptions thereof are omitted. Also according to the present embodiment 2, acoustic insulation bodies are disposed at opposing locations on a roof 3 of a mobile vehicle with the power collector intervened therebetween. A main acoustic insulation body 1L and an acoustic insulation body 2L having a smaller height than 1L are disposed on top of the roof 3 in a similar formation as embodiment 1 on one side (left side) in the width direction of the vehicle body, but the acoustic insulation body 2L does not have a branched acoustic insulation body. On the other hand, a main acoustic insulation body 1R and an acoustic insulation body 2R having a smaller height than 1R are disposed on top of the roof 3 in a similar formation as embodiment 1 on the other side (right side) in the width direction of the vehicle body, but the acoustic insulation body 2R does not have a branched acoustic insulation body.

Figure 6:
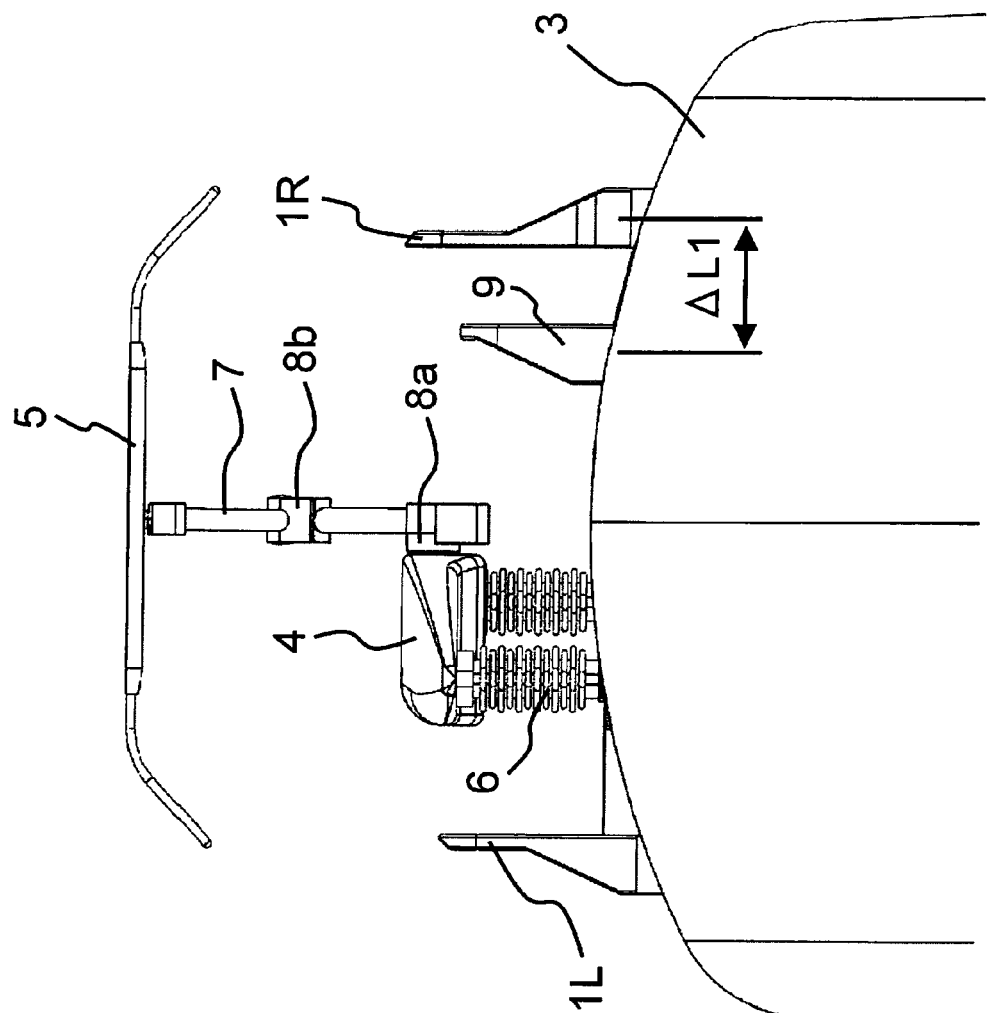
FIG. 6 is a front view of the power collector unit shown in FIG. 5.

FIG. 6 illustrates a front view of the present embodiment. As shown in FIG. 6, the acoustic insulation bodies are disposed on both sides in the width direction of the vehicle body having the power collector intervened therebetween. In the present embodiment, a secondary insulation body 9 is disposed between the acoustic insulation body 1R and the acoustic insulation body 2R (not shown in FIG. 6) and the power collector on the other side (right side) in the width direction of the vehicle body. The secondary acoustic insulation body 9 has a smaller height than the acoustic insulation body 1R but has a greater height than the acoustic insulation body 2R, and is substantially equal to the height of the insulator 6, wherein the overall shape thereof is a chevron shape, similar to the acoustic insulation body 1R. Aerodynamic noise is generated if a secondary acoustic insulation body 9 is disposed at a position receiving the influence of the wake flow of acoustic insulation bodies 1R and 2R, so that the secondary acoustic insulation body 9 is disposed at a position on the inner side in the width direction of the vehicle body from the acoustic insulation body 2R and in parallel with the acoustic insulation body 2R, but with a distance approximately double the thickness ($\Delta L1$) in the width direction of the vehicle body of the acoustic insulation bodies 1R and 2R. According to the configuration of the present embodiment, the power collector is placed at a position offset toward the left side with respect to the center of the vehicle, so that the position in which the secondary acoustic insulation body 9 is placed ensures an insulation distance with respect to the high voltage section of the power collector. On the other hand, the secondary acoustic insulation body cannot be disposed between the power collector and the acoustic insulation bodies 1L and 2L, based on the relationship between the insulation distance with the collector shoe 5 when the arm 7 is at a folded state.

Figure 7:
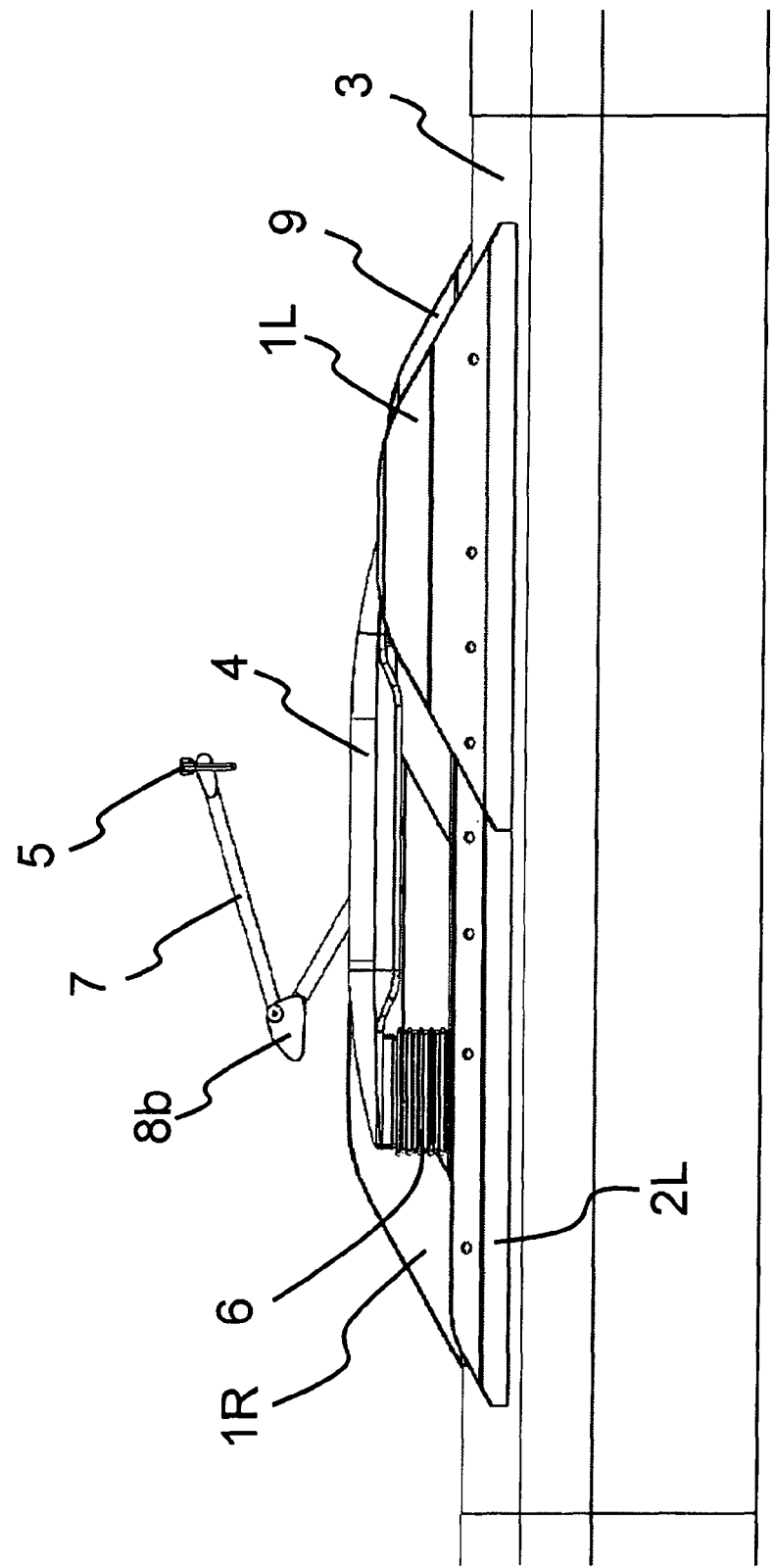
FIG. 7 is a left side view of the power collector unit shown in FIG. 5.
Figure 8:
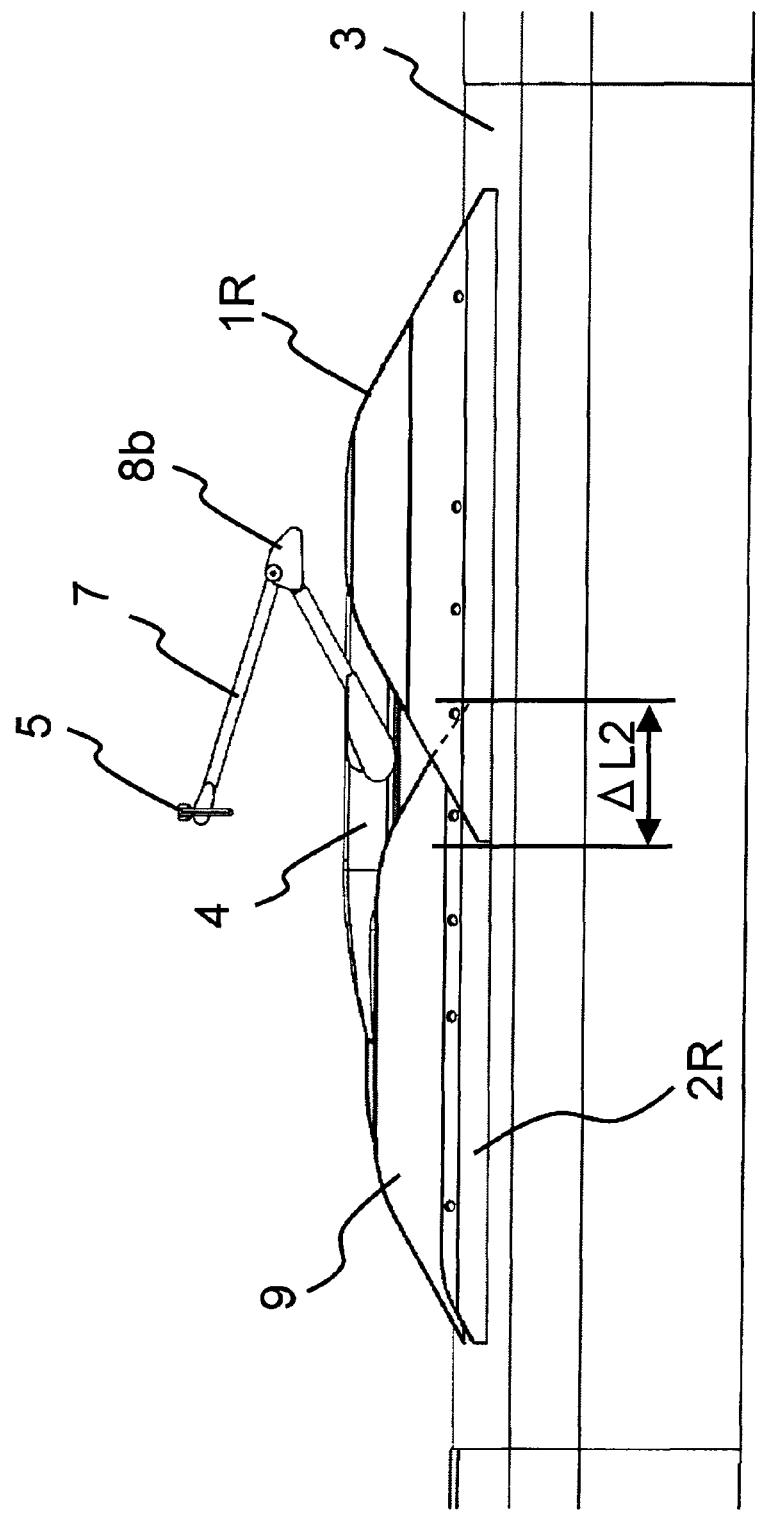
FIG. 8 is a right side view of the power collector unit shown in FIG. 5.

FIG. 7 illustrates the present configuration from the left side, and FIG. 8 illustrates the present configuration from the right side. Especially, as illustrated in FIG. 8, the secondary acoustic insulation body 9 is arranged at a displaced position with respect to the acoustic insulation bodies 1R and 2R disposed on the right side, and when seen from the side, the secondary acoustic insulation body 9 has a portion of the area thereof overlapped with the acoustic insulation bodies 1R and 2R. The area in which the acoustic insulation body 1R and the secondary acoustic insulation body 9 are overlapped in the longitudinal direction of the vehicle body is shown as $\Delta L2$. This area $\Delta L2$ is the overlapped area at the skirt portion of the chevron shapes of the acoustic insulation body 1R and the secondary acoustic insulation body 9, so that the heights thereof are low, and the insulation distance with respect to the collector shoe 5 when the arm 7 is folded can be ensured.

Embodiment 3

Figure 9:
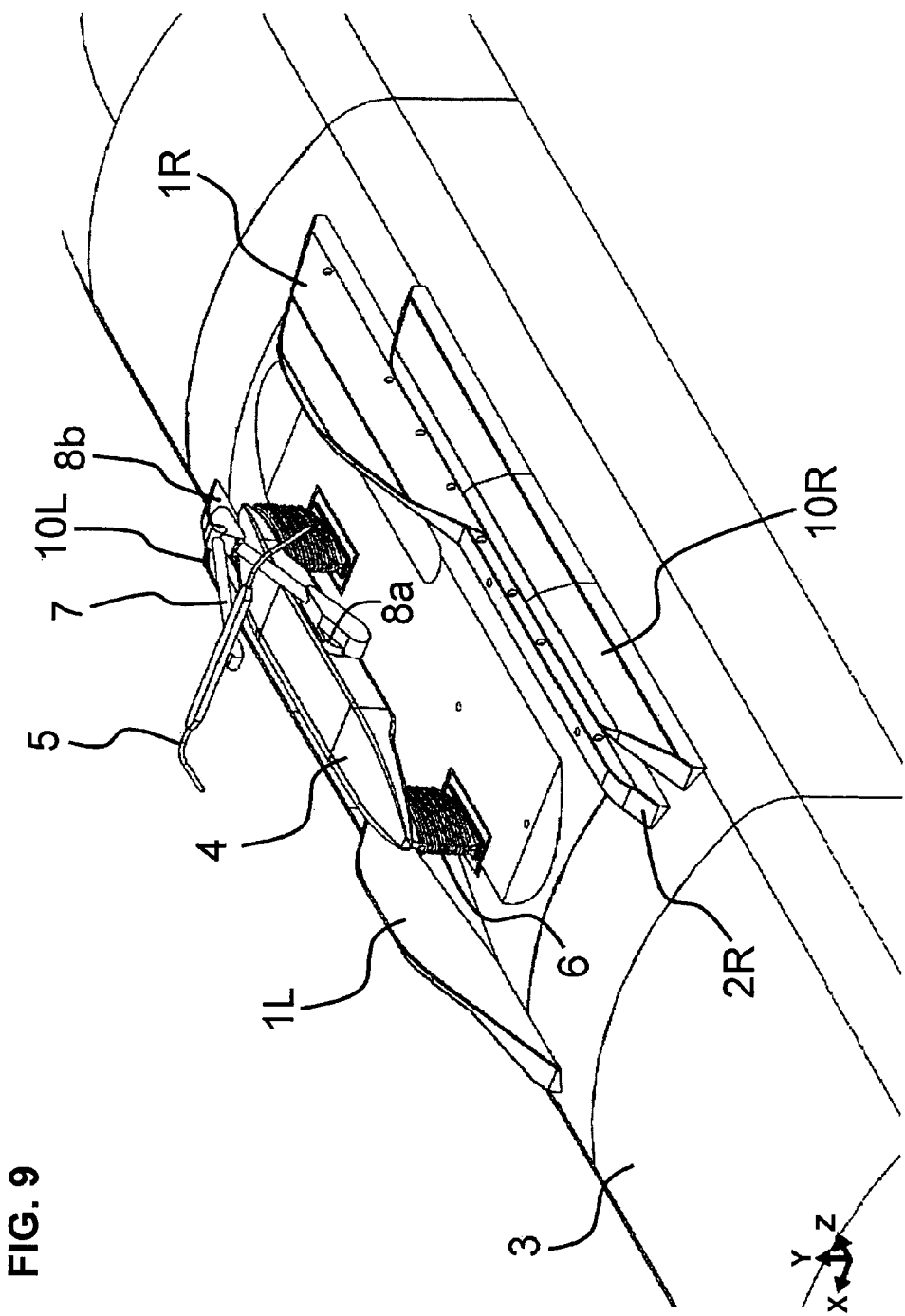
FIG. 9 is a perspective view of the power collector unit illustrating a third preferred embodiment of the acoustic insulation device for a mobile vehicle.

The third embodiment of the present invention will be described with reference to FIGS. 9 through 12. FIGS. 9 through 12 are views illustrating a third embodiment of an acoustic insulation device for a mobile vehicle according to the present invention, showing the device in perspective view, front view, left side view and right side view, respectively. The members exerting equivalent functions as those of embodiment 1 are denoted by the same reference numbers in embodiment 3, and detailed descriptions thereof are omitted. Also according to the present embodiment 3, acoustic insulation bodies are disposed at opposing locations so as to intervene the power collector on a roof 3 of a mobile vehicle. According to embodiment 3, as shown in FIG. 9, a secondary acoustic insulation body 10L is disposed on an outer side in the width direction of the vehicle body of the acoustic insulation bodies 1L and 2L disposed on the left side, and a secondary acoustic insulation body 10R is disposed on an outer side in the width direction of the vehicle body of the acoustic insulation bodies 1R and 2R on the right side.

Figure 10:
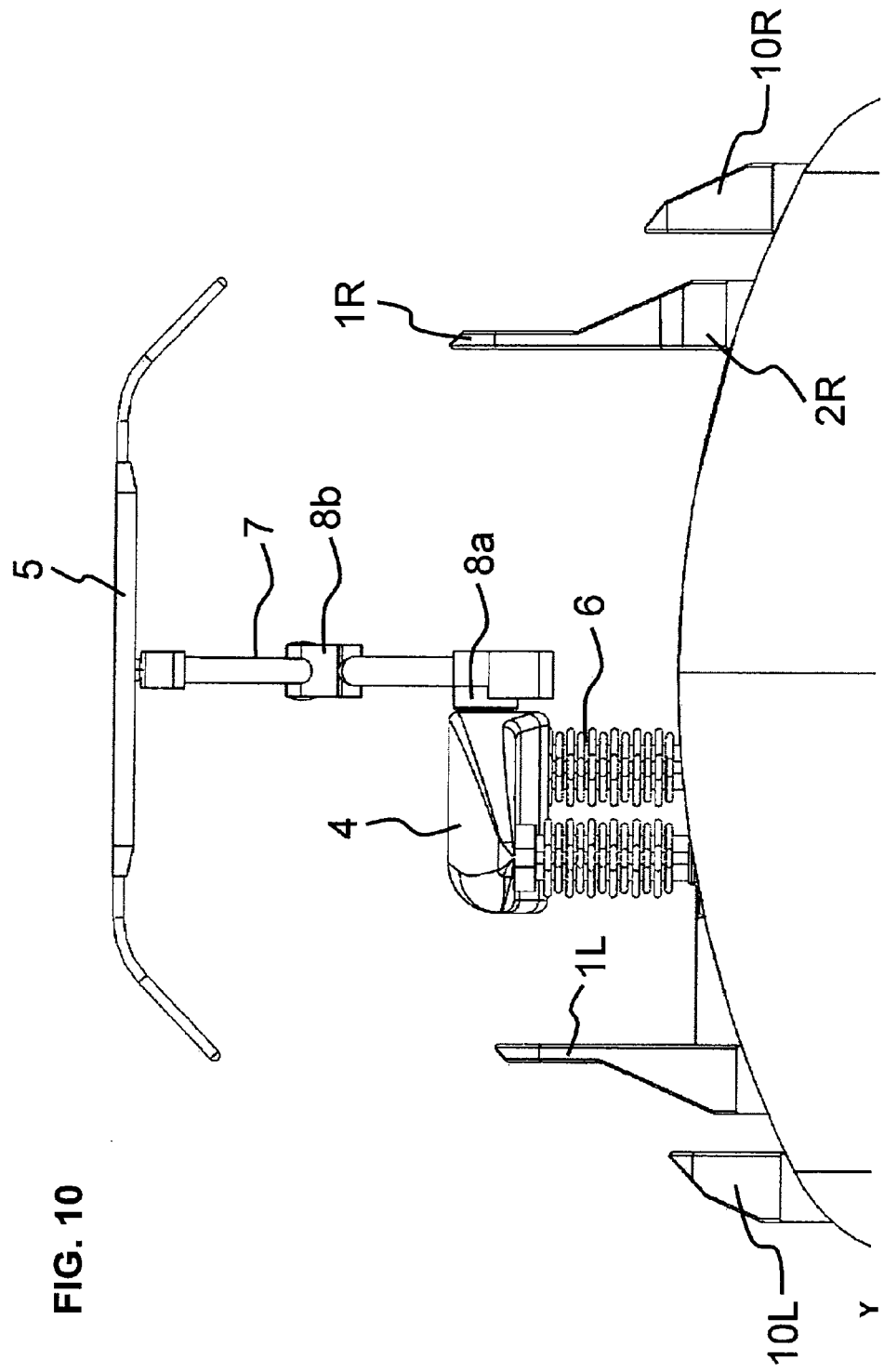
FIG. 10 is a front view of the power collector unit shown in FIG. 9.

FIG. 10 illustrates a front view of the present configuration. As shown in FIG. 10, the acoustic insulation bodies 1R and 2R and the acoustic insulation bodies 1L and 2L are disposed on both sides in the width direction of the vehicle body having the power collector intervened therebetween. In the present embodiment, the secondary acoustic insulation body 10R is disposed on the outer side in the width direction of the vehicle body of the acoustic insulation bodies 1R and 2R disposed on the right side of the power collector, and on the other hand, the secondary acoustic insulation body 10L is disposed on the outer side of the acoustic insulation bodies 1L and 2L disposed on the left side of the power collector. The height of the secondary acoustic insulation bodies 10L and 10R are respectively at a same level as the height of the acoustic insulation bodies 2L and 2R, and the overall shapes thereof are a low chevron shape in which both ends thereof in the longitudinal direction of the vehicle body are shaped similarly as the ends of acoustic insulation bodies 2L and 2R. Similar to embodiment 2, aerodynamic noise may occur if the distance between the acoustic insulation bodies and the secondary acoustic insulation bodies is small, so that the secondary acoustic insulation bodies 10L and 10R are positioned on the outer side in the width direction of the vehicle body to acoustic insulation bodies 2L and 2R and in parallel with the acoustic insulation bodies 2L and 2R but with a distance approximately double the thickness of the acoustic insulation bodies 1R and 2R in the width direction of the vehicle body. The secondary acoustic insulation bodies 10L and 10R are extended in the longitudinal direction of the vehicle body to reach the position corresponding to approximately the center of the acoustic insulation bodies 1L and 2L in the longitudinal direction of the vehicle body. Since the secondary acoustic insulation bodies 10L and 10R are disposed on the outer side of the acoustic insulation bodies 1L and 2L and the acoustic insulation bodies 1R and 1R in the width direction of the vehicle body, they must be restricted to a shape to fit within the critical range of a vehicle in conventional railway sections, but they are positioned at insulation distances from the high voltage section of the power collector.

Figure 11:
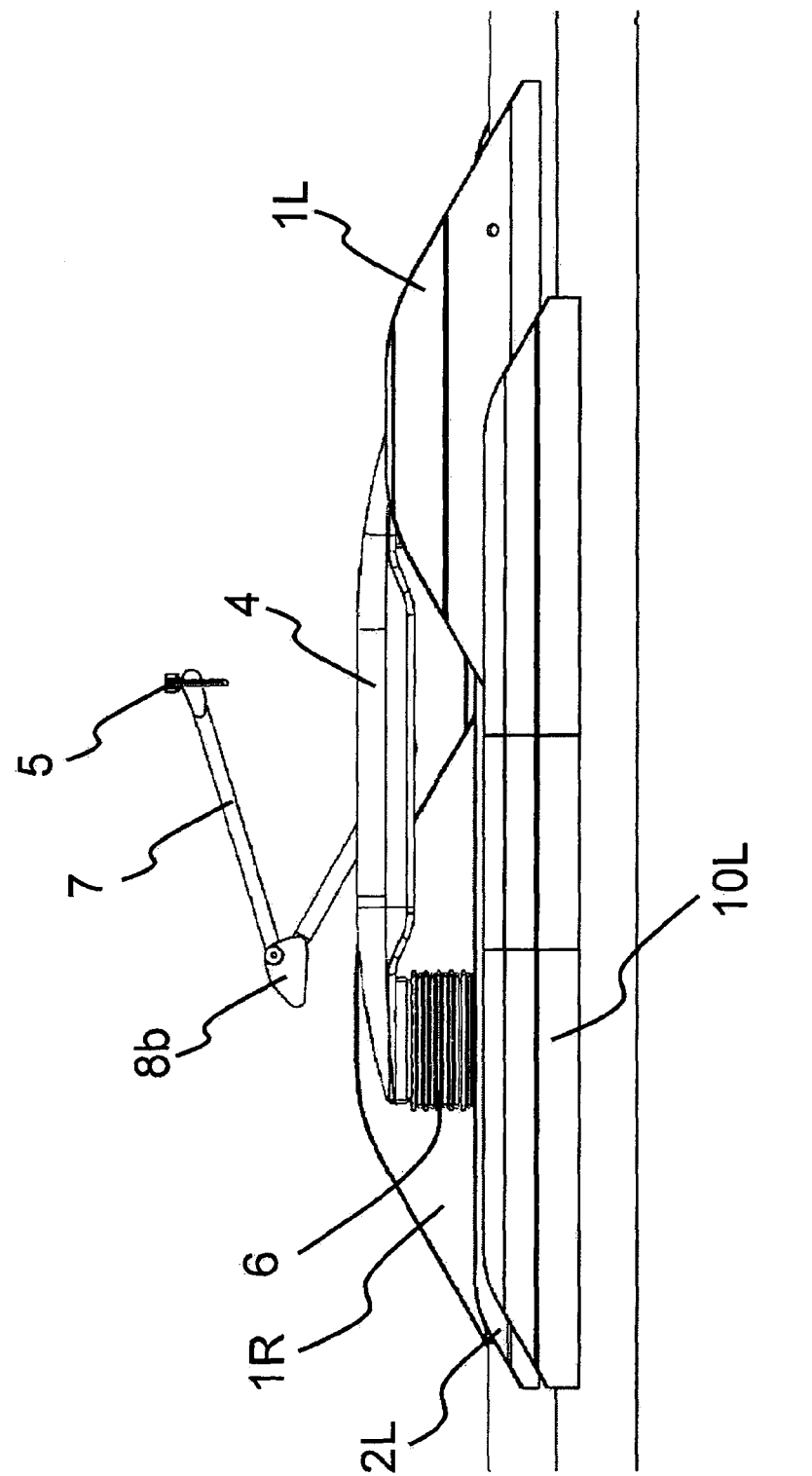
FIG. 11 is a left side view of the power collector unit shown in FIG. 9.
Figure 12:
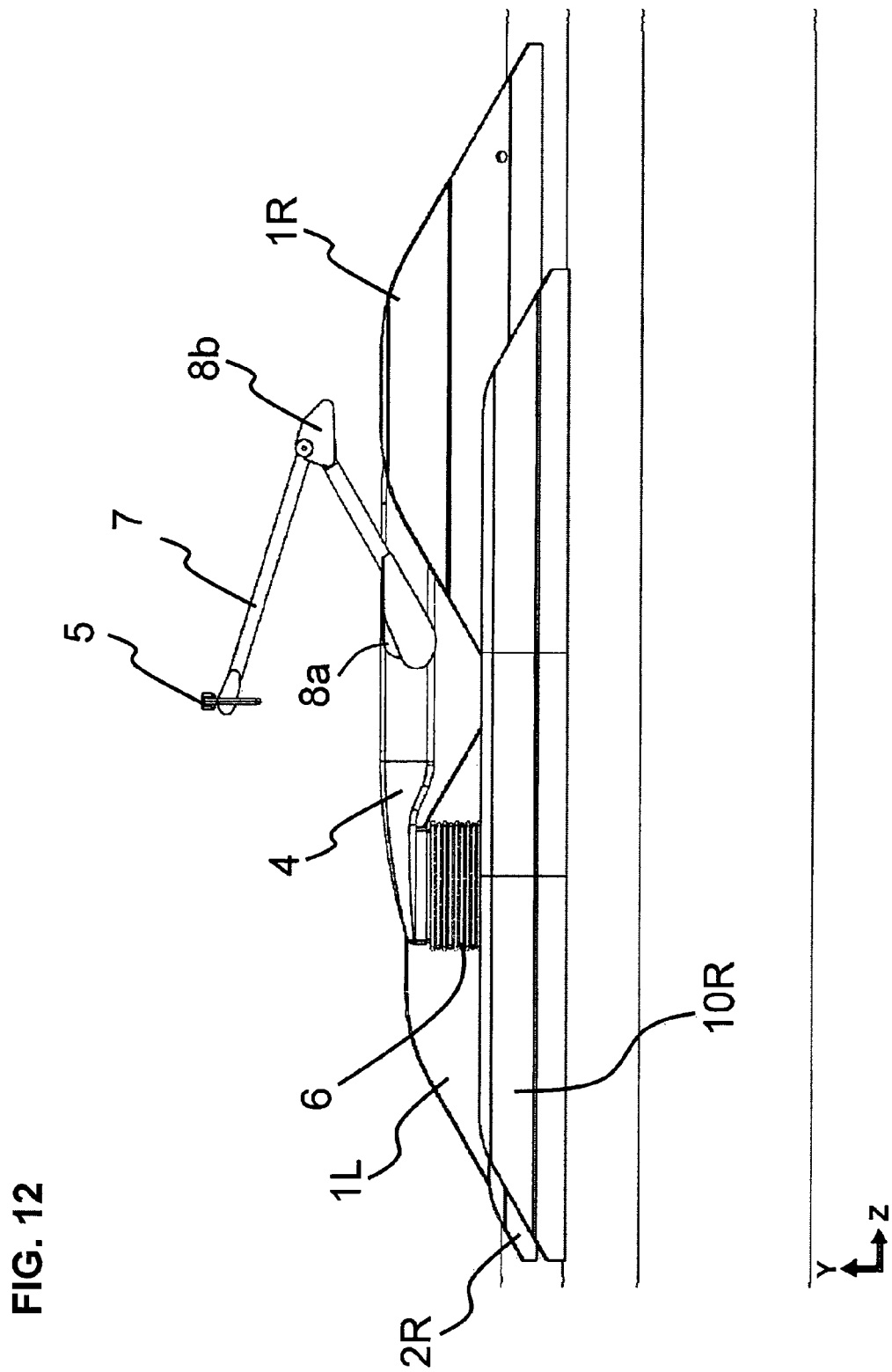
FIG. 12 is a right side view of the power collector unit shown in FIG. 9.

FIG. 11 illustrates the present configuration from the left side, and FIG. 12 illustrates the present configuration from the right side. Especially, as shown in FIG. 11, with respect to the acoustic insulation bodies 1L and 2L on the left side, the secondary acoustic insulation body 10L is basically positioned within the area blocked by the acoustic insulation bodies 1L and 2L when seen from the side, but as shown in FIG. 12, with respect to the acoustic insulation bodies 1R and 2R on the right side, the secondary acoustic insulation body 10R has a somewhat higher height than the height of the acoustic insulation body 2R, and it is located to cover the open space formed on the upper area of the skirts of the overlapped acoustic insulation bodies 1R and 2R (range ΔL2 shown in FIG. 8 of embodiment 2) when seen from the side. The secondary acoustic insulation body 10R contributes to prevent leakage of noise through this space. Since the secondary acoustic insulation body 10R is disposed on the outer side of the right-side acoustic insulation bodies 1R and 2R in the width direction of the vehicle body, insulation distance can be ensured from the collector shoe 5 when the arm 7 of the power collector is folded.

The present invention has been described taking a railway vehicle as an example of the mobile vehicle, but the present invention is not restricted thereto, and it can be applied to vehicles in which noise is generated from a rooftop device such as a power collector when traveling at high speed. Moreover, the secondary acoustic insulation body 9 and the secondary acoustic insulation bodies 10L and 10R have been distinguished in the specification, but it is possible to adopt both secondary acoustic insulation bodies as long as various limitations such as space are satisfied.

REFERENCE SIGNS LIST 1L, 1R Acoustic insulation body
1LB, 1RB1, 1RB2 Branched acoustic insulation body
2L, 2R Acoustic insulation body
3 Roof
4 Underframe
5 Collector shoe
6 Insulator
7 Arm
8a, 8b Hinge
9, 10L, 10R Secondary acoustic insulation body
ΔL2 Overlap area

The invention claimed is:
1. An acoustic insulation device for a mobile vehicle having at least one acoustic insulation body provided upright on a roof of the vehicle body on roof on both sides in a width direction of the vehicle body so as to oppose to a device disposed; wherein
in order to suppress transmission of a noise generated in, and in the vicinity of, the device and diffracted or reflected on the acoustic insulation body, an acoustic insulation body branched from the at least one acoustic insulation body is provided to at least one side or to both sides of an outer side and an inner side in the width direction of the vehicle body;
the at least one acoustic insulation body provided upright to the roof is a wall body having a chevron shape in the longitudinal direction of the vehicle body, and the branched acoustic insulation body is a blade-shaped acoustic insulating body with both ends of the branched acoustic insulation body in the longitudinal direction of the vehicle body extended obliquely upward with respect to the longitudinal direction of the vehicle body; and
the acoustic insulation device and the branched acoustic insulation body acts on the noise to an outer side of the vehicle body.

2. The acoustic insulation device for a mobile vehicle according to claim 1, wherein
the at least one acoustic insulation body provided upright on the roof is divided into a chevron-shaped acoustic insulation body having a higher height and a chevron-shaped acoustic insulation body having a lower height in a longitudinal direction of the vehicle body.

3. The acoustic insulation device for a mobile vehicle according to claim 2, wherein
the at least one acoustic insulation body branched toward an outer side in the width direction of the vehicle body is formed to the lower acoustic insulation body, and extended to cover a portion or all of the higher acoustic insulation body in the longitudinal direction of the vehicle body.

4. The acoustic insulation device for a mobile vehicle according to claim 1, wherein
in order to suppress transmission of the diffracted or reflected noise, a secondary acoustic insulation body is provided to at least one side or to both sides of an inner side and an outer side in the width direction of the vehicle body to the at least one acoustic insulation body provided upright to the roof; and
the secondary acoustic insulation body is disposed so that in a projection from the width direction of the vehicle body, a portion of the secondary acoustic insulation body overlaps with a portion of the at least one acoustic insulation body provided upright to the roof.

5. The acoustic insulation device for a mobile vehicle according to claim 4, wherein
the at least one acoustic insulation body provided upright on the roof is divided into a chevron-shaped acoustic insulation body having a higher height and a chevron-shaped acoustic insulation body having a lower height in a longitudinal direction of the vehicle body; and
the secondary acoustic insulation body is disposed on the inner side of the lower chevron-shaped acoustic insulation body in the width direction of the vehicle body, and has a chevron shape with a higher height than the lower chevron-shaped acoustic insulation body.

6. The acoustic insulation device for a mobile vehicle according to claim 5, wherein
the secondary acoustic insulation body is overlapped with the higher chevron-shaped acoustic insulation body at skirt portions of the chevron shapes when observed from the width direction of the vehicle body.

7. The acoustic insulation device for a mobile vehicle according to claim 4, wherein
the at least one acoustic insulation body provided upright on the roof is divided into a chevron-shaped acoustic insulation body having a higher height and a chevron-shaped acoustic insulation body having a lower height in a longitudinal direction of the vehicle body; and
the secondary acoustic insulation body is disposed on the outer side of the lower chevron-shaped acoustic insulation body in the width direction of the vehicle body, and having a chevron shape with an equivalent or lower height than the lower chevron-shaped acoustic insulation body.

8. The acoustic insulation device for a mobile vehicle according to claim 7, wherein
the secondary acoustic insulation body is extended in a longitudinal direction of the vehicle body to reach a position opposing to a portion or all of the at least one acoustic insulation body having a higher height.

9. The acoustic insulation device for a mobile vehicle according to claim 1, wherein
the branched acoustic insulation body or the second acoustic insulation body ensures a critical range of a vehicle required to be satisfied by an outer shape of the vehicle body and an insulation distance from a high voltage portion of the power collector.

10. The acoustic insulation device for a mobile vehicle according to claim 4, wherein
the branched acoustic insulation body or the secondary acoustic insulation body ensures a critical range of a vehicle required to be satisfied by an outer shape of the vehicle body and an insulation distance from a high voltage portion of the power collector.

11. An acoustic insulation device for a mobile vehicle having at least one acoustic insulation body provided upright on each side of a roof of a vehicle body in a width direction of the vehicle body and having a first height length and a lower height length provided in a longitudinal direction of the vehicle body, so as to oppose to a device disposed on the roof, the lower height length having at least two tips provided in the width direction of the vehicle body along at least a portion of the lower height length; wherein
the acoustic insulation device acts on a noise generated in, and in a vicinity of, the device and diffracted or reflected on each said at least one acoustic insulation body, to suppress transmission of the noise to an outer side of the vehicle body.

12. The acoustic insulation device for a mobile vehicle according to claim 11, wherein
in order to assist to suppress transmission of the diffracted or reflected noise, a branched acoustic insulation body branched from an acoustic insulation body of the at least one acoustic insulation body, is provided to at least one side or to both sides of an outer side and an inner side in the width direction of the vehicle body.

13. The acoustic insulation device for a mobile vehicle according to claim 12, wherein
the at least one acoustic insulation body provided upright on the roof is divided, in the longitudinal direction of the vehicle body, into a chevron-shaped acoustic insulation body as a higher acoustic insulation body having a higher height including the first height length, and a chevron-shaped acoustic insulation body as a lower acoustic insulation body having a lower height including the lower height length.

14. The acoustic insulation device for a mobile vehicle according to claim 12, wherein
the at least one acoustic insulation body provided upright to the roof is a wall body having a chevron shape in the longitudinal direction of the vehicle body, and the branched acoustic insulation body is a blade-shaped acoustic insulation body extended obliquely upward.

15. The acoustic insulation device for a mobile vehicle according to claim 11, wherein
in order to assist to suppress transmission of the diffracted or reflected noise, a secondary acoustic insulation body is provided to at least one side or to both sides on an inner side and/or an outer side in the width direction of the vehicle body, relative to a primary acoustic insulation body provided as part of the at least one acoustic insulation body provided upright to the roof; and
the secondary acoustic insulation body is disposed so that in a projection from the width direction of the vehicle body, a portion of the secondary acoustic insulation body overlaps with a portion of the primary acoustic insulation body of the at least one acoustic insulation body provided upright to the roof.

16. The acoustic insulation device for a mobile vehicle according to claim 15, wherein
 the primary acoustic insulation body of the at least one acoustic insulation body provided upright on the roof, is divided into a chevron-shaped acoustic insulation body having a higher height and a chevron-shaped acoustic insulation body having a lower height in a longitudinal direction of the vehicle body; and
 the secondary acoustic insulation body is disposed on the inner side of the lower chevron-shaped acoustic insulation body in the width direction of the vehicle body, and has a chevron shape with a higher height than the lower chevron-shaped acoustic insulation body.

17. The acoustic insulation device for a mobile vehicle according to claim 15, wherein
 the primary acoustic insulation body of the at least one acoustic insulation body provided upright on the roof, is divided into a chevron-shaped acoustic insulation body having a higher height and a chevron-shaped acoustic insulation body having a lower height in a longitudinal direction of the vehicle body; and
 the secondary acoustic insulation body is disposed on the outer side of the lower chevron-shaped acoustic insulation body in the width direction of the vehicle body, and having a chevron shape with an equivalent or lower height than the lower chevron-shaped acoustic insulation body.

18. The acoustic insulation device for a mobile vehicle according to claim 12, wherein a tip of the branched acoustic insulation body and another tip of at least one acoustic insulation body, are the at least two tips provided in the width direction of the vehicle body along at least the portion of the lower height length.

19. The acoustic insulation device for a mobile vehicle according to claim 12, wherein:
 the at least one acoustic body is more specifically a first acoustic body and a second acoustic body provided separately on the roof
 a tip of the first acoustic body and a tip of the second acoustic body, are the at least two tips provided in the width direction of the vehicle body along at least the portion of the lower height length.

* * * * *